June 25, 1929.  J. GRIEM  1,718,782
MOTION PICTURE APPARATUS
Filed March 14, 1927 2 Sheets-Sheet 1
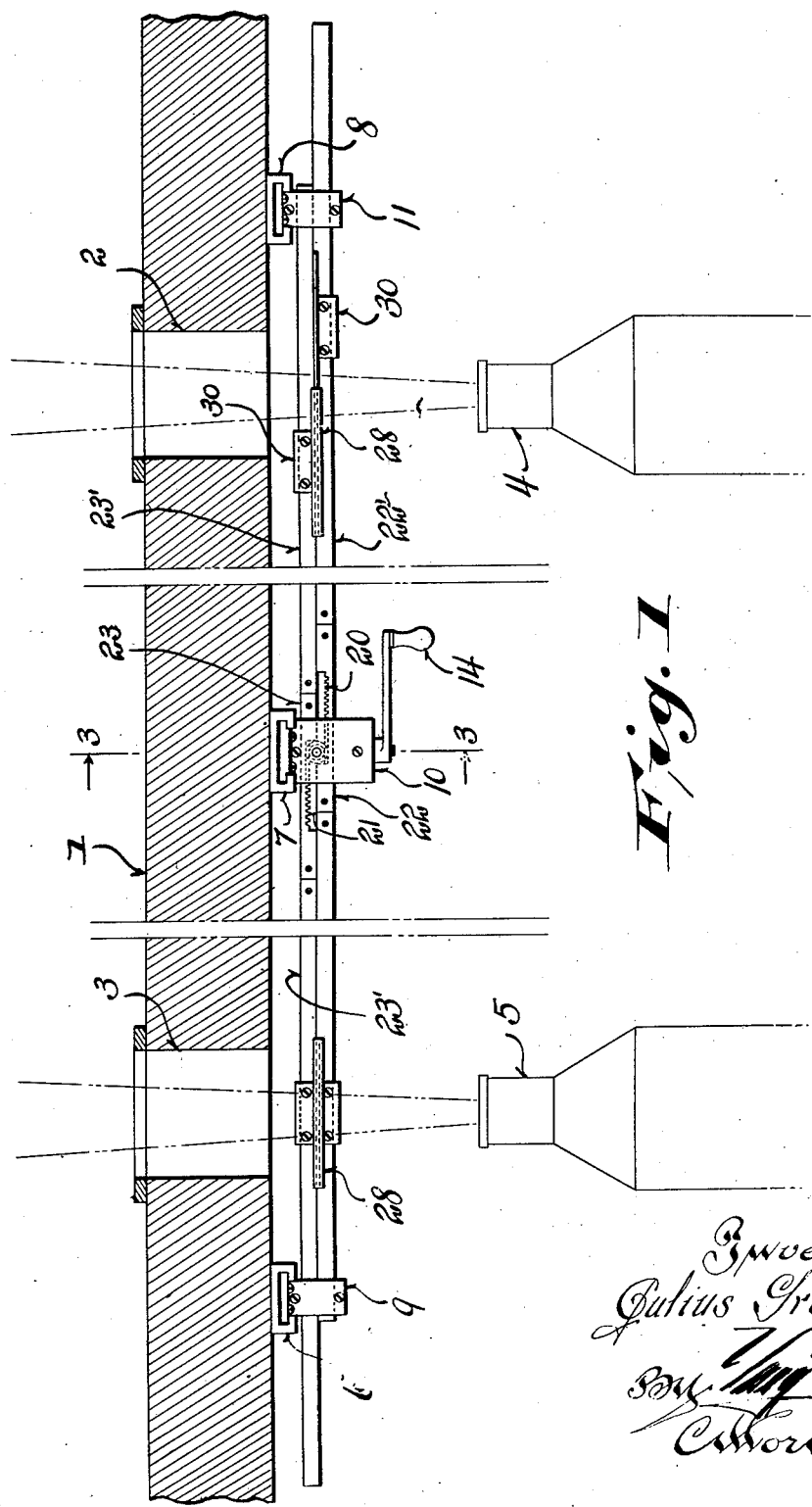

June 25, 1929. J. GRIEM 1,718,782
MOTION PICTURE APPARATUS
Filed March 14, 1927 2 Sheets-Sheet 2
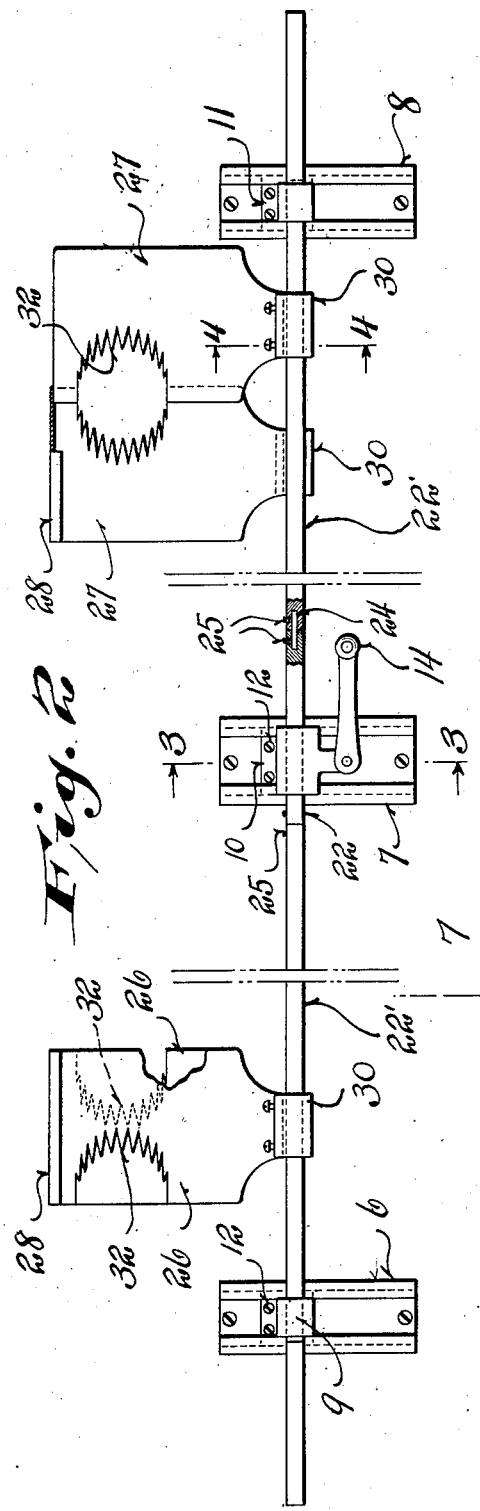
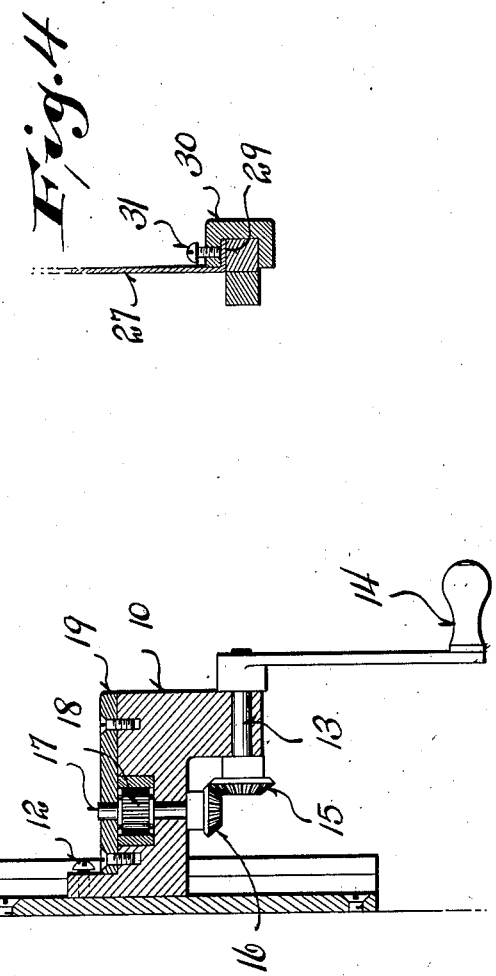

Patented June 25, 1929.

1,718,782

UNITED STATES PATENT OFFICE.

JULIUS GRIEM, OF APPLETON, WISCONSIN.

MOTION-PICTURE APPARATUS.

Application filed March 14, 1927. Serial No. 175,104.

This invention relates to motion picture apparatus, and is particularly directed to a device for controlling the motion picture projection.

Objects of this invention are to provide a device which is adapted to be mounted in the projecting room of a motion picture theater and which is constructed to cooperate with two projectors in a novel and effective manner to gradually cut off the light from one of the projectors and simultaneously gradually admit the light from the other projector so that a smoothly dissolving effect is produced and one picture fades out gradually while the other picture gradually builds up in strength in exact proportion to the dimming of the first picture, thus avoiding any abrupt or irregular changes.

Further objects are to provide a device which is eminently practical and easy to construct and install, and which is so made that it may be knocked down or separated into its major component parts to permit the shipping thereof in a compact formation.

Further objects are to provide a device in which the several parts are easily adjustable vertically, and in which the shields are independently adjustable laterally, so that an exact relation between the projector and the shields may be easily attained.

A further object of this invention is to provide a device of the above described type which does not require any thought on the part of the operator and merely requires the simple manipulation of a crank or lever, such operation automatically and simultaneously gradually dimming the picture from one projector and gradually increasing the strength of the picture from the other projector.

An embodiment of the invention is shown in the accompanying drawings in which:

Figure 1 is a sectional view through the front wall of a projecting room showing diagrammatically a pair of projectors and showing the apparatus in position:

Figure 2 is an elevation of the structure shown in Figure 1;

Figure 3 is a sectional view on the line 3—3 of Figures 1 and 2;

Figure 4 is a sectional view on the line 4—4 of Figure 2.

Referring to the drawings, it will be seen that the front wall 1 of a projecting room has been shown as provided with a pair of outlet apertures 2 and 3, for the rays of light from the projector, indicated diagrammatically at 4 and 5. The device is mounted inwardly of the wall 1, as shown in Figure 1, and comprises three supporting members 6, 7, and 8, which are attached to the inner face of the wall. These supporting members are in reality guides having overhanging flanges between which slides 9, 10, and 11, are carried. These slides are each provided with set screws 12 which are adapted to bind against the body of the guides to thus lock the parts in their adjusted position. The construction is more clearly shown in connection with the central guide shown in enlarged section in Figure 3. This central guide carries the slide 10, as previously stated, and this slide is slightly different from the other slides. It consists of an angularly shaped member which carries a horizontal crank shaft 13 provided with a manipulating crank 14. The shaft also carries a bevel gear 15 which meshes with a second bevel gear 16 mounted on a vertical shaft 17. The shaft 17 rigidly carries a small pinion 18 and is held in place by means of the plate 19. This pinion 18 meshes with a pair of racks 20 and 21 formed on the bars 22 and 23. The bars 22 and 23 are composite or, in other words, formed in sections, the sections of the bar 22 being indicated by the reference character 22', and the section of the bar 23 being indicated by the reference character 23'. These sections are detachably joined in any suitable manner, preferably by means of a pin or member 24 (see Figure 2) which sockets in recesses formed in the abutting ends of the sections and is secured to each section by means of a set screw 25, thus permitting ready separation of the elongated bars into their component parts.

The bars are rectangular in cross section and are each carried by the three guides 9, 10, and 11. These bars carry adjacent the openings 2 and 3 through the front wall of the projecting room, pairs of shields 26 and 27. One shield of each pair is provided with a downturned upper edge, indicated at 28 in Figures 1 and 2, which receives and guides the upper edge of the corresponding shield. Further, each of the shields is provided with a reduced outwardly turned bottom portion 29 (see Figure 4) which is clamped to the appropriate bar by means of the U-shaped clamp 30 provided with the set screws 31, as shown in detail in Figure 4. The clamps are located opposite sides of the respective bars, as shown particularly in Figure 1, so that they will slide past each other without interference.

The shields 26 and 27 are formed as stated, in pairs, and each pair is provided with a cutout of approximately semi-circular contour roughly, which is defined by inwardly projecting tongues or serrations 32 (see Figure 2). These serrations project inwardly into the cutout portions of the shields and when the shields are separated they do not interfere with the free passage of the light rays from the projector. However, as the shields are drawn towards each other and gradually slide one upon the other, the area of opening is constricted and the fingers or serrations 32 gradually project into the light beam, and due to their tapered formation cut off more and more of the light rays in a very gradual and even manner. It is to be noted also that the shields are so positioned upon the bars that when one of the pairs of shields is closing, the other pair is opening and also that this opening permits a very gradual building up of the strength of the passing light beam.

It will be seen, therefore, that all that is necessary for the operator to do is to rotate the crank 14 in the desired direction to cause one pair of shields to cut off the light and the other pair to move out of the light beam to thus permit its gradual building up while the other beam is gradually cut off.

Thus, a perfect dissolving effect is produced by this simple and easily manipulated device.

The exact vertical adjustment desired may obviously be had by loosening the set screws 12 of the slides 9, 10, and 11, and adjusting them vertically, thereafter locking the set screws. The horizontal adjustment of each individual slide is readily attained by loosening the set screws 31 of the clamps 30 and properly positioning the slide horizontally upon its respective bar.

There is no chance of separation of the slides one from the other, as they are guided at their lower ends by the bars themselves, and at their upper ends by their interfitting edges.

It is to be noted also that the device is readily adapted to be knocked down and shipped in a compact formation. It is merely necessary to loosen the set screws 25 and separate the bars into their parts.

Although the invention has been described in considerable detail, such description is intended as illustrative rather than limiting as the invention may be variously embodied and as the scope of such invention is to be determined as claimed.

Although the invention has been described as used with two projectors, it is to be understood that it can be used with three or more projectors as desired.

I claim:

1. In a motion picture apparatus, the combination of a projecting room having a front wall provided with a pair of apertures, a pair of projectors mounted behind the apertures, a plurality of guides secured to said wall, slides vertically adjustable in said guides, a pair of bars slidably carried by said slides, means for simultaneously reciprocating said bars in reverse directions, and a pair of shield members located at each aperture and carried by said bars with the elements of each pair positioned one in front of the other, with the corresponding element of each pair connected to opposite bars, whereby upon relative motion of the bars, reverse action of the shields is produced.

2. In a motion picture apparatus, the combination of a projecting room having a front wall provided with a pair of apertures, a pair of projectors mounted behind the apertures, a plurality of members supported by said wall, a pair of bars slidably carried by said members, means for simultaneously reciprocating said bars in reverse directions, a pair of shield members located at each aperture and carried by said bars with the elements of each pair positioned one in front of the other, the free edges of the elements of each pair being slidably interlocked.

3. In a motion picture apparatus, the combination of a plurality of guides for attachment to a support, a plurality of slides carried by said guides and vertically adjustable therein, a pair of detachably jointed bars slidably carried by said slides, racks carried by said bars, a pinion located between and meshing with said racks, a crank for operating said pinion, a pair of shields carried by said bars and each pair having elements carried by different bars, the elements of one pair being reversely connected to the bars with respect to the elements of the other pair, said shields being detachable from said bars.

4. In a motion picture apparatus, the combination of a plurality of members attached to a support, a pair of bars slidably carried by said members, racks carried by said bars, a pinion located between and meshing with said racks, a crank for operating said pinion, a pair of shields carried by said bars and each having elements carried by different bars, the elements of one pair being reversely connected to the bars with respect to the elements of the other pair.

In testimony that I claim the foregoing I have hereunto set my hand at Appleton, in the county of Outagamie and State of Wisconsin.

JULIUS GRIEM.